(12) United States Patent
Borkar et al.

(10) Patent No.: US 11,028,538 B2
(45) Date of Patent: Jun. 8, 2021

(54) COMPOSITION AND METHOD FOR INCREASING WET AND DRY PAPER STRENGTH

(71) Applicant: SOLENIS TECHNOLOGIES, L.P., Wilmington, DE (US)

(72) Inventors: Sachin Borkar, Wilmington, DE (US); Daniel F. Varnell, Wilmington, DE (US)

(73) Assignee: SOLENIS TECHNOLOGIES, L.P., Wilmington, DE (US)

( * ) Notice: Subject to any disclaimer, the term of this patent is extended or adjusted under 35 U.S.C. 154(b) by 23 days.

(21) Appl. No.: 16/288,477

(22) Filed: Feb. 28, 2019

(65) Prior Publication Data

US 2020/0277735 A1    Sep. 3, 2020

(51) Int. Cl.
| | |
|---|---|
| *D21H 21/20* | (2006.01) |
| *D21H 17/37* | (2006.01) |
| *D21H 17/36* | (2006.01) |
| *D21H 17/24* | (2006.01) |
| *C08F 20/56* | (2006.01) |
| *C08F 20/58* | (2006.01) |

(52) U.S. Cl.
CPC ............. *D21H 21/20* (2013.01); *C08F 20/56* (2013.01); *C08F 20/58* (2013.01); *D21H 17/24* (2013.01); *D21H 17/36* (2013.01); *D21H 17/375* (2013.01)

(58) Field of Classification Search
None
See application file for complete search history.

(56) References Cited

U.S. PATENT DOCUMENTS

| | | | | |
|---|---|---|---|---|
| 3,053,787 A | * | 9/1962 | Suen ....................... | C08K 3/346 524/229 |
| 3,556,932 A | * | 1/1971 | Coscia ..................... | C08F 8/28 162/166 |
| 4,605,702 A | * | 8/1986 | Guerro ................. | D21H 17/375 525/154 |
| 4,954,538 A | | 9/1990 | Dauplaise et al. | |
| 7,641,766 B2 | * | 1/2010 | St. John ................. | D21H 21/20 162/166 |
| 8,703,847 B2 | | 4/2014 | Wright | |
| 8,900,412 B2 | | 12/2014 | Borkar et al. | |
| 8,926,797 B2 | | 1/2015 | Jehn-Rendu et al. | |
| 9,719,213 B2 | * | 8/2017 | Miller, IV ........... | B32B 37/0053 |
| 9,873,983 B2 | * | 1/2018 | Zhu ........................ | D21H 17/37 |
| 9,873,986 B2 | * | 1/2018 | Zhu ...................... | D21H 17/375 |
| 9,879,381 B2 | | 1/2018 | Wright | |
| 2004/0132896 A1 | | 7/2004 | Kubota et al. | |
| 2008/0064819 A1 | * | 3/2008 | Wright ...................... | C08F 8/28 525/244 |
| 2011/0146925 A1 | | 6/2011 | Bode et al. | |
| 2013/0062029 A1 | | 3/2013 | Levin et al. | |
| 2014/0174685 A1 | * | 6/2014 | Gu ......................... | D21H 21/06 162/168.7 |
| 2014/0311696 A1 | * | 10/2014 | Viazmensky .......... | D21H 17/36 162/146 |
| 2016/0273167 A1 | | 9/2016 | Zhang et al. | |
| 2017/0291403 A1 | * | 10/2017 | Miller, IV .............. | D21H 19/10 |
| 2017/0314204 A1 | | 11/2017 | Lu et al. | |

* cited by examiner

*Primary Examiner* — Dennis R Cordray
(74) *Attorney, Agent, or Firm* — Lorenz & Kopf, LLP

(57) ABSTRACT

A composition for increasing paper strength includes a dialdehyde-modified polyacrylamide strengthening agent, a water soluble compound that is soluble at about 5 wt % or greater in water at about 25° C., and water. The water soluble compound is typically present in a weight amount that is greater than a weight amount of the strengthening agent. The composition is formed by combining the strengthening agent and the water soluble compound in aqueous media to form the composition, wherein on a dry basis the water soluble compound is typically present in a greater amount than the strengthening agent, drying the composition to form a powder or paste that has a water content of less than about 10 weight percent and is stable after storage at about room temperature for about six months, and reconstituting the powder or paste by adding water thereto. The reconstituted composition may then be used to make paper.

20 Claims, No Drawings

COMPOSITION AND METHOD FOR INCREASING WET AND DRY PAPER STRENGTH

TECHNICAL FIELD

The present disclosure generally relates to a composition and method for increasing wet and dry paper strength. More specifically, this disclosure relates to forming the composition, drying the composition such that it is shelf-stable, reconstituting the composition, and then using the reconstituted composition to make paper.

BACKGROUND

Glyoxalated polyacrylamides (GPAM) resins have been widely used in the paper industry in aqueous solutions. These GPAM resins are commonly added at the wet end of paper making processes and improve paper making process and paper properties. The performance of these GPAM resins can be improved by increasing molecular weight altering polymer structure, and/or by controlling level of reactive glyoxal functionality. However, low solids, temperature and pH sensitivity and relatively short shelf life of GPAM resins is a major commercial concern. It would be desirable to have a GPAM resin with a longer shelf life, stability during shipping, and a high concentration during shipping. However, up to this point, this problem has not been solved.

Several options to improve stability of GPAM resins are known in the art. These options involve use of stabilizing agents (US 2011/0146925 A1), using low molecular weight acrylamide-based polymers for glyoxalation (U.S. Pat. No. 4,605,702), or using microparticles of a glyoxalated polyacrylamide prepared by inverse emulsion polymerization techniques (U.S. Pat. No. 4,954,538). More recently, BASF (U.S. Pat. Nos. 8,703,847 B2, 9879381 B2) disclosed shipping of high solid polyacrylamide solutions and performing glyoxalation reactions at mill sites. This process needs precise control of pH and temperature to produce reproducible materials.

However, none of these methods solve the problem at hand.

GPAM resins, when dried on their own, cannot be dissolved back into water and the aldehyde functionality is no longer available to impart paper strength properties. Moreover, highly concentrated GPAM solutions have even shorter shelf lives than lower concentrated solutions. The products used in industry are typically only about 10% solids as stored and sold.

Accordingly, there remains an opportunity for improvement and development of a composition and method that meet current industry needs. Furthermore, other desirable features and characteristics of the present disclosure will become apparent from the subsequent detailed description of the disclosure and the appended claims, taken in conjunction with the accompanying drawings and this background of the disclosure.

BRIEF SUMMARY

This disclosure provides a composition for increasing paper strength. The composition includes a dialdehyde-modified polyacrylamide strengthening agent, a water soluble compound that comprises one or more hydroxyl or amide moieties and that is soluble at about 5 wt % or greater in water at about 25° C., and water. Moreover, the water soluble compound is typically present in a weight amount that is greater than a weight amount of the dialdehyde-modified polyacrylamide strengthening agent.

This disclosure also provides a method of forming the composition. The method includes the steps of combining the dialdehyde-modified polyacrylamide strengthening agent and the water soluble compound in aqueous media to form the composition, wherein on a dry basis the water soluble compound is typically present in a greater amount than the dialdehyde-modified polyacrylamide strengthening agent. The method also includes the step of drying the composition to form a powder or paste that has a water content of less than about 10 weight percent and is stable after storage at about room temperature for about six months, and the step of reconstituting the powder or paste by adding water thereto.

This disclosure further provides a method for increasing the wet and/or dry strength of paper. This method includes the step of combining the dialdehyde-modified polyacrylamide strengthening agent and the water soluble compound in aqueous media to form the composition, wherein on a dry basis the water soluble compound is present in a greater amount than the dialdehyde-modified polyacrylamide strengthening agent. The method also includes the step of drying the composition to form a powder or paste that has a water content of less than about 10 weight percent and is stable after storage at about room temperature for about six months, reconstituting the powder or paste by adding water thereto, providing an aqueous slurry of cellulosic fibers, combining the reconstituted composition and the aqueous slurry of cellulosic fibers, and forming the paper from the combination of the reconstituted composition and the aqueous slurry of cellulosic fibers wherein the paper has increased wet and/or dry strength as compared to a paper formed without the reconstituted composition.

DETAILED DESCRIPTION

The following detailed description is merely exemplary in nature and is not intended to limit the composition for increasing paper strength. Furthermore, there is no intention to be bound by any theory presented in the preceding background or the following detailed description.

Embodiments of the present disclosure are generally directed to compositions for increasing paper strength and methods for forming the same. For the sake of brevity, conventional techniques related to making such compositions may not be described in detail herein. Moreover, the various tasks and process steps described herein may be incorporated into a more comprehensive procedure or process having additional steps or functionality not described in detail herein. In particular, various steps in the formation of such compositions may be well-known and so, in the interest of brevity, many conventional steps will only be mentioned briefly herein or will be omitted entirely without providing the well-known process details.

As used herein and unless otherwise stated: (1) all percentages, parts, ratios, etc., are by weight; (2) when an amount, concentration, or other value or parameter, is given as a list of upper preferable values and lower preferable values, this is to be understood as specifically disclosing all ranges formed from any pair of an upper typical value and a lower typical value, regardless whether ranges are separately disclosed; (3) the term "total solids" refers to the solids that remain after the volatiles (e.g., solvents) have been removed; (4) the term "active solids" refers to the at least one GPAM resin portion of the total solids remaining after subtraction of water soluble compound used in the feed.

Composition

This disclosure provides a composition for increasing paper strength. The composition may be a liquid, a powder, or a paste. Alternatively, the composition may change from a liquid to a powder and/or a paste or from a powder to a paste, or vice versa, at various points during a method of manufacture and/or use.

Paper strength is typically measured based on dry strength or wet strength. In various embodiments, the composition of this disclosure provides an increase of at least about 80, 85, 90, 95, or greater, percent, in dry strength of paper formed using this composition as compared to a paper formed without the instant composition. In other embodiments, the composition of this disclosure provides an increase of at least about 80, 85, 90, 95, or greater, percent, in wet strength of paper formed using this composition as compared to a paper formed without the instant composition. Typically, wet strength is determined using TAPPI Method T456 using a Finch Cup. Typically, dry strength is determined using TAPPI Test Method T494.

In other embodiments, this composition provides a wet and/or dry strength of paper that is about 25, 30, 35, 40, 45, 50, 55, 60, 65, 70, 75, 80, 85, 90, 95 or even 100, % of the wet and/or dry strength of paper formed using GPAM alone that is not dried and then reconstituted. In fact, in other embodiments, this composition provides a wet and/or dry strength of paper that is about a 5, 10, 15, 20, or even greater percent, improvement of the wet and/or dry strength of paper formed using GPAM alone that is not dried and then reconstituted. This performance is important because it allows compositions of this disclosure to be shipped without water and to be shelf-stable. That drastically reduces shipping costs and complexities and solves the aforementioned problems.

In another embodiment the above compositions impart wet-strength and/or temporary wet-strength and/or dry strength to paper formed or treated with the reconstituted compositions. For example, in one embodiment, the composition is powdered and has a shelf-life of at least six months such that wet strength and/or dry strength paper performance after six months is at least about 80% of wet strength and/or dry strength paper performance measured within one month of manufacture of the composition. In other embodiments, the wet strength and/or dry strength paper performance after six months is at least about 85, 90, 95, or greater, % of wet strength and/or dry strength paper performance measured within one month of manufacture of the composition.

In various embodiments, the composition includes, consists essentially of, or consists of, a dialdehyde-modified polyacrylamide strengthening agent, a water soluble compound that includes one or more hydroxyl or amide moieties and that is soluble at about 5 wt % or greater in water at about 25° C., and water. In various embodiments, this composition may include, or be free of, any one or more additives or other compounds described below.

In various embodiments, the composition has a solids of less than about 5, 10, 15, 20, 25, or 30 wt %. In other embodiments, the composition has a solids content of from about 10 wt % to about 30 wt %. In still other embodiments, the composition has a solids content of greater than about 30 wt %. The solids content is typically formed from any compounds that are non-volatile after extraction of water soluble compounds.

In other embodiments, the composition is soluble as an about 1 wt % solution in water at about 25° C. In other embodiments, the composition is soluble as an about 1 to 5 wt % solution in water at about 25° C. The composition itself can be totally soluble in water, e.g. have a solubility of up to about 100%. However, that is different from the amount of the composition actually used. The composition can be used, for example, in an amount of up to about 5 wt % in water.

In one embodiment the composition imparts both wet-strength and better retention of chemicals during the paper-making process. Retention of chemical may describe retention of fines and other similar artifacts, as is appreciated and understood by those of skill in the art.

Dialdehyde-Modified Polyacrylamide Strengthening Agent

The dialdehyde-modified polyacrylamide strengthening agent is not particularly limited and may be any dialdehyde-modified polyacrylamide in the art. For example, the dialdehyde-modified polyacrylamide may be further defined as a glyoxalated polyacrylamide that includes an aldehyde group, also known as a GPAM or GPAM resin. Other non-limiting examples of suitable dialdehyde-modified polyacrylamides include cationic polyacrylamides, acrylamide DADMAC (polydiallyldimethylammonium chloride) copolymers, and the like, and combinations thereof.

In other embodiments, the dialdehyde-modified polyacrylamide strengthening agent may be cationic and be a copolymer that is or includes the reaction product of an acrylamide monomer and cationic monomer. Examples of suitable cationic monomers include polydiallyldimethylammonium chloride monomers and the like, as would be understood by those of skill in the art.

In further embodiments, the dialdehyde-modified polyacrylamide strengthening agent is further defined as a polyacrylamide resin with reactive aldehyde based groups. In another embodiment, a prepolymer used to form a GPAM resin wherein the prepolymer can be cationic, anionic or amphoteric in nature. Various ionic monomers that can be incorporated into the GPAM prepolymer and thus into the GPAM resin are not particularly limited and may be chosen by one of skill in the art. In various embodiments, monomers such as diallyldimethylammonium chloride or acrylamide-methylpropane sulfonic acid can be used.

In other embodiments, the dialdehyde-modified polyacrylamide strengthening agent is the reaction product of glyoxal and a prepolymer that is the reaction product of a polyacrylamide monomer and a diallyldimethylammonium chloride monomer, wherein an acrylamide to diallylmethylammonium chloride molar ratio is from about 99:1 to about 50:50, respectively, and wherein about 40 mol % of acrylamide groups of the polyacrylamide monomer are reacted and about 15 mol % of acrylamide groups have active aldehyde functionality.

The dialdehyde-modified polyacrylamide strengthening agent is not particularly limited in amount in this composition. In various embodiments, the amount of the dialdehyde-modified polyacrylamide strengthening agent is set forth as a ratio with the water soluble compound, described in greater detail below. For example, the water soluble compound may be present in a dry weight ratio with the dialdehyde modified polyacrylamide strengthening agent that is greater than about 1:1, about 1.5:1, about 2:1, about 2.5:1, about 3:1, about 3.5:1, about 4:1, about 4.5:1, or about 5:1, or even greater, respectively. Typically, the water soluble compound is present in a weight amount that is greater than a weight amount of the dialdehyde-modified polyacrylamide strengthening agent. Relative to weight percent, the dialdehyde-modified polyacrylamide strengthening agent may be present in an amount of from about 1 to about 20, about 2 to about 10, about 2 to about 8, about 5 to about 10, or about 5 to about 8, pounds (lbs) per ton of dry paper. In other embodiments, the dialdehyde-modified polyacrylamide strengthening agent may be present in an amount of 1, 2, 3, 4, 5, 6, 7, 8, 9, 10, etc. up to 20, pounds (lbs) per ton of dry paper. In various non-limiting embodiments, all values and ranges of values including and between those set forth above are hereby expressly contemplated for use.

In various embodiments, the dialdehyde-modified polyacrylamide strengthening agent is formed using a vinylamide polymer and a reactive agent, as is described below. Backbone vinylamide polymers, which can be subsequently glyoxalated, may be synthesized by free radical or redox catalysis polymerization of a vinylamide monomer, and optionally one or more ionic comonomer(s) or nonionic comonomers. Cross-linking agents with multiple polymerizable vinyl functionalities can also be included to impart structure to the backbone polymer. A chain transfer agent, such as sodium hypophosphite, may be used to control the molecular weight of the polymer molecules, as well as to introduce branching.

The vinylamide polymer may be formed by any suitable polymerization process. The polymers may be prepared by solution polymerization, water-in-oil suspension polymerization or by water-in-oil emulsion polymerization. The polymers may be produced as beads by suspension polymerization or as a water-in-oil emulsion or dispersion by water-in-oil emulsion polymerization. Alternatively the vinylamide polymer may be provided as a dispersion in an aqueous medium. This may for instance be a dispersion of vinylamide particles of at least 20 microns in an aqueous medium containing an equilibrating agent. This may for example also include aqueous dispersions of vinylamide particles prepared by the polymerization of aqueous monomers in the presence of an aqueous medium containing dissolved low intrinsic viscosity polymers such as poly diallyl dimethyl ammonium chloride and optionally other dissolved materials for instance electrolyte and/or multihydroxy compounds e.g. polyalkylene glycols.

The vinylamide polymers that can be glyoxalated can be of any molecular weight obtainable by methods of polymer synthesis known to those skilled in the art. The vinylamide polymer may be nonionic, cationic, anionic or amphoteric. The vinylamide polymer may be crosslinked or structured. The average molecular weight of the vinylamide polymer may be from 500 to about 5,000,000 or even 10,000,000 Daltons.

The starting vinylamide polymer typically has an average molecular weight of at least 500, but more typically at least about 10,000 to about 5,000,000. For example, 50,000 to 2,000,000, 70,000 to 1,000,000 are envisioned. In various non-limiting embodiments, the process of the disclosure allows glyoxalation of vinylamide polymers of about 50,000 or greater, about 70,000 or greater and even about 85,000 or 100,000 or greater. Typical average molecular weight ranges are for example between 5,000 to about 150,000, 10,000 to about 150,000 or 25,000 to about 150,000.

Suitable vinylamide monomers are (meth)acrylamide, C1-C4 mono substituted (meth)acrylamides such as N-methyl(meth)acrylamide, N-ethyl(meth)acrylamide. The most typical vinyl monomers are acrylamide and methacrylamide. The term (meth)acrylamides includes both acrylamide and methacrylamide.

The vinylamide content provides the sites to which the reactive agent or glyoxal substituents are attached. The minimum proportion of vinylamide units which can be present can be sufficient so that the glyoxalated polymer is thermosetting, such that the glyoxalated polymer forms a water-insoluble film when it is laid down from water solution on a glass plate and heated for 5 minutes at about 105° C. Thus the vinylamide polymer (before glyoxalation) can be formed from at least about 10 wt. % vinylamide monomers. Typically, the vinylamide polymer is formed from at least about 20 to about 100 wt. % vinylamide monomers. For example, the vinylamide polymer is at least formed from about 20 to about 99 wt %, at least about 25 to about 90 wt. % vinylamide monomers, or at least about 50 wt. % and most typically at least about 70 wt % vinylamide monomers. The wt. % is based on the weight of the total weight of monomers charged to form the vinylamide polymer. Once the monomers polymerize, they become incorporated units in the polymer. Thus there may be units in the polymers of the present disclosure which may confer ionic properties upon the polymer, or those which act as diluents or spacers, or which confer special properties, for example, improved or diminished water-solubility.

Ionic comonomers, which can be used in conjunction with vinylamide monomers, can be cationic, potentially cationic, anionic, potentially anionic or amphoteric. When using cationic comonomers, one or more cationic monomers can be used, and the total amount of cationic monomer can be such that a glyoxal adduct of the vinylamide copolymer is self-substantive to cellulose fibers in aqueous suspension. Cationic comonomers can also be used.

Suitable cationic monomers or potentially cationic monomers include diallyldialkyl amines, 2-vinylpyridine, 2-(dialkylamino)alkyl(meth)acrylates, dialkylamino alkyl(meth)acrylamides, including acid addition and quaternary ammonium salts thereof. Specific examples of such cationic monomers or potentially cationic monomers are diallyldimethyl ammonium chloride, (meth)acryloyloxy ethyl trimethylammonium chloride (dimethyl amino ethyl(meth)acrylate, methyl chloride quaternary salt), 2-vinyl-N-methylpyridinium chloride, (p-vinylphenyl)trimethylammonium chloride, (meth)acrylate 2-ethyltrimethylammonium chloride, 1-methacryloyl-4-methyl piperazine, Mannich poly acrylamides i.e. polyacrylamide reacted with dimethyl amine formaldehyde adduct to give the N-(dimethyl amino methyl) and (meth)acrylamido propyltrimethyl ammonium chloride. Potentially cationic monomers may be for example monomers that give a cationic charge under acidic conditions such as when an amine functionality on the potentially cationic monomer is protonated.

The amount of cationic comonomer may be from about 0% to about 90 wt. %, about 0.1 to about 50 wt %, about 0.1 to about 40, about 0.1 to about 30, about 0.1 to about 25 wt % or about 0.1 to about 15 or about 10 wt. percent. The wt. % is based on the total weight of monomer(s) charged to form the vinylamide polymer.

Suitable anionic monomers may be selected from vinyl acidic material such as acrylic acid, methacrylic acid, maleic acid, allyl sulfonic acid, vinyl sulfonic acid, itaconic acid, fumaric acid, potentially anionic monomers such as maleic anhydride and itaconic anhydride and their alkali metal and ammonium salts, 2-acrylamido-2-methyl-propanesulfonic acid and its salts, sodium styrene sulfonate and the like. Alternatively, if the starting vinylamide polymer is polyacrylamide, it may be partially hydrolysed to achieve some anionic character then functionalized with the reactive agent. Potentially anionic monomers may be for example acrylamide, which when partially hydrolysed forms an acid which may give anionic character to the polymer under basic conditions. Alternatively, the potentially anionic monomers may be for instance an anhydride monomer, such as maleic anhydride or itaconic anhydride, which can be hydrolysed to form the corresponding acid.

The vinylamide polymer may be amphoteric; that is the polymer may include anionic and cationic functionality. The amphoteric vinylamide polymer may be formed from both anionic and cationic monomers or alternatively from zwitterionic monomers. The various monomers (anionic, cationic and/or zwitterionic) may be reacted in any wt. ratio to form the amphoteric vinylamide polymer. It is preferable that the predominate charge on the formed amphoteric vinylamide polymer be cationic. Thus, the mole % of cationic monomer dominates over the mole % anionic monomer incorporated into the amphoteric vinylamide polymer.

Suitable non-ionic monomers other than the vinylamide may be selected from the group consisting of (meth) acrylic esters such as octadecyl(meth)acrylate, ethyl acrylate, butyl acrylate, methylmethacrylate, hydroxyethyl(meth)acrylate and 2-ethylhexylacrylate; N-alkyl acrylamides, N-octyl (meth)acrylamide, N-tert-butyl acrylamide, N-vinylpyrrolidone, N,N-dialkyl(meth)acrylamides such as N,N'-dimethyl acrylamide; styrene, vinyl acetate, hydroxy alkyl acrylates and methacrylate such as 2-hydroxy ethyl acrylate and acrylonitrile.

The starting vinylamide polymer or formed vinylamide polymer adduct may be crosslinked, branched or otherwise structured or linear. For example, the starting vinylamide polymer or formed vinylamide polymer adduct may be linear, crosslinked, chain-transferred, or crosslinked and chain-transferred (structured).

Cross linking agents are typically polyethylenically unsaturated crosslinking agents. Examples are methylene bis(meth)acrylamide, triallylammonium chloride; tetraallyl ammonium chloride, polyethyleneglycol diacrylate; polyethyleneglycol dimethacrylate; N-vinyl acrylamide; divinylbenzene; tetra(ethyleneglycol)diacrylate; dimethylallylaminoethylacrylate ammonium chloride; diallyloxyacetic acid, Na salt; diallyloctylamide; trimethylpropane ethoxylate triacrylate; N-allylacrylamide N-methylallylacrylamide, pentaerythritol triacrylate and combinations thereof. Other systems for crosslinking can be used instead of or in addition to this. For instance covalent crosslinking through pendant groups can be achieved, for instance by the use of ethylenically unsaturated epoxy or silane monomers, or by the use of polyfunctional crosslinking agents such as silanes, epoxies, polyvalent metal compounds or other known crosslinking systems.

Chain transfer agents may be used to synthesize the starting vinylamide polymer. Suitable chain transfer agents are 2-mercaptoethanol; low molecular weight organic acids such as lactic acid, formic acid, malic acid or butyric acid; isopropyl alcohol; thioacids and hypophosphites.

Referring now to the reactive agent, the reactive agent typically includes more than one aldehyde moiety. The reactive reagents can be selected from the group consisting of glyoxal, glutaraldehyde, furan dialdehyde, 2-hydroxyadipaldehyde, succinaldehyde, dialdehyde starch, diepoxy compounds, and combinations thereof. Glyoxal is the typical reactive agent. The molar ratio of amide (on the vinylamide polymer) to reactive agent typically varies from about 12:1 to about 2:1, for example, about 10:1 to about 2.5:1, about 6:1 to about 2.5:1 and about 6:1 to about 3:1. The molar content of amide on the vinylamide polymer may be determined experimentally by methods well known in the art or calculated from the known monomer composition.

Base addition or changing the pH to above 7 is the most common method of catalyzing the glyoxalation reaction. Typically, a pH range of 7 to 13 is generally considered to be a catalytic environment for the reaction. For example, a pH range of 8 to 12 is especially appropriate. Alternatively, a concentrated pH buffer solution may be added to maintain pH.

Water Soluble Compound

Referring now to the water soluble compound, this compound is soluble at about 5 wt % or greater in water at about 25° C. Solubility, or being soluble, is typically defined as the analytical composition of a saturated solution expressed as a proportion of a designated solute in a designated solvent. In this case, the water soluble compound is dissolvable when present at 5% or greater in water at about 25° C. In other embodiments, the water soluble compound is soluble at about 10, 15, 20, or 25 wt %, or greater, e.g. up to 90, 95, or even greater wt %, in water at about 25° C.

The water soluble compound may be polymeric or may be an individual compound. In other embodiments, mixtures of polymers and individual compounds can be utilized. In one embodiment the water soluble compound has the ability to impart beneficial properties to paper.

In various embodiments, the water soluble compound includes multiple hydroxyl, and/or amide, and/or urea groups. In one embodiment, the water soluble compound includes one or more than one hydroxyl group.

In various embodiments, the water soluble compound is chosen from a carbohydrate, a polyvinyl alcohol (PVA polymer), an acrylamide containing polymer, or combinations thereof. For example, the carbohydrate may be further defined as a monosaccharide, disaccharide, polysaccharide, and combinations thereof. As such, the water soluble compound may be chosen from monosaccharides, disaccharides, polysaccharides, and combinations thereof. In various embodiments, the water soluble compound is maltodextrin. However, any saccharide may be utilized.

In other embodiments, the water soluble compound is an acrylamide containing polymer. Suitable non-limiting examples include amphoteric polyacrylamides, amphoteric polyacrylamide copolymers with water soluble monomers, and combinations thereof. Choice of the water soluble compound may be made by one of skill in the art depending on whether dry or wet strength is being targeted for improvement.

In one embodiment the water soluble compound is a small molecule, or a macromolecule derived from natural material, or prepared by modification of natural material, or chemically synthesized.

In one embodiment the water soluble compound includes or is a small molecule, an oligomer or polymer. In one embodiment the water soluble compound has three or more hydroxyl groups or the oligomer or polymer has three or more hydroxyl groups per repeat unit. In one embodiment the water soluble compound is a carbohydrate. In one embodiment the water soluble compound includes an oligo or polymeric saccharide. In one embodiment the water soluble compound is glycerol.

In one embodiment the water soluble compound includes a polymer with acrylamide repeat units. In one embodiment the acrylamide is polymerized with monomers containing cationic functionality, or anionic functionality or combination of both. In one embodiment, acrylamide containing polymer can be functionalized.

In one embodiment, the water soluble compound is further defined as a copolymer formed from reaction of organic monomers. The monomers are not particularly limited and may be chosen from acrylamide monomers, saccharides, hydroxyl containing monomers, amide containing monomers, carboxyl containing monomers, aldehyde containing monomers, and the like, and combinations thereof. Alternatively, the monomer may be any polar or hydrophilic monomer, as would be recognized by one of skill in the art.

When the dialdehyde-modified polyacrylamide strengthening agent and the water soluble compound are combined, typically the dialdehyde-modified polyacrylamide strengthening agent reacts with the water soluble compound such that most of the available aldehyde groups (hemi acetals) of the dialdehyde-modified polyacrylamide strengthening agent are reacted with hydroxyl groups of the water soluble compound. In one embodiment there is an excess of hydroxyl groups as compared to reactive aldehyde groups. For example, there may be 1.5, 2, 3, or even more times an amount of hydroxyl groups as compared to reactive aldehyde groups.

In one embodiment, the disclosure provides a composition including a glyoxalated polyacrylamide resin mixed on a molecular level with a water soluble compound. The whole mixture of GPAM and water soluble compound is not present as a water solution and the GPAM mixture when placed in water will generate a solution including the GPAM such that the GPAM can impart wet and/or dry strength properties to paper.

In one embodiment, a final reactive GPAM resin is produced by reconstituting the aldehyde groups by dissolving the above composition in water. In another embodiment the hydroxyl groups are replaced by other chemical groups that form a reversible bond upon reaction with the reactive aldehyde groups of a GPAM resin.

As described above, the water soluble compound may be present in a dry weight ratio with the dialdehyde modified polyacrylamide strengthening agent that is greater than about 1:1, about 1.5:1, about 2:1, about 2.5:1, about 3:1, about 3.5:1, about 4:1, about 4.5:1, or about 5:1, or even greater, respectively. Typically, the water soluble compound is present in a weight amount that is greater than a weight amount of the dialdehyde-modified polyacrylamide strengthening agent. Relative to weight percent, the water soluble compound may be present in an amount of from about 1 to about 100, pounds (lbs) per ton of dry paper or any weight percent that corresponds to the aforementioned weight percents and ratios of the water soluble compound and the dialdehyde modified polyacrylamide strengthening agent. The water soluble compound is typically present in a weight amount that is greater than the dialdehyde modified polyacrylamide strengthening agent. However, if based on molar ratios, the water soluble compound and the dialdehyde modified polyacrylamide strengthening agent are typically present in molar amounts such that there are more hydroxyl groups present than aldehyde groups. The molar ratio of hydroxyl groups to aldehyde groups may be, for example, greater than about 1:1, about 1.5:1, about 2:1, about 2.5:1, about 3:1, about 3.5:1, about 4:1, about 4.5:1, or about 5:1, or even greater, respectively. It is contemplated that, in some embodiments, even though the molar amount of hydroxyl groups is greater than the molar amount of aldehyde groups, the weight of the compounds that include the aldehyde groups, i.e., the dialdehyde modified polyacrylamide strengthening agent, may be greater than the weight of the compound that includes the hydroxyl groups, i.e., the water soluble compound. Accordingly, it is not always the case that the water soluble compound is present in a weight amount that is greater than the weight amount of the dialdehyde modified polyacrylamide strengthening agent, so long as a molar amount of hydroxyl groups is the same or greater than the molar amount of aldehyde groups. In various non-limiting embodiments, all values and ranges of values including and between those set forth above are hereby expressly contemplated for use.

Water

The composition also includes water. The water can be present in almost any amounts. Typically, the water is present in an amount of at least about 95, 95.5, 95, 96.5, 97, 97.5, 98, 98.5, 99, 99.5, etc. weight percent based on a total weight of the composition. Typically, the remaining amount, such that the total weight adds up to 100 weight percent total, is the combination of the dialdehyde modified polyacrylamide strengthening agent and the water soluble compound. In various non-limiting embodiments, all values and ranges of values including and between those set forth above are hereby expressly contemplated for use.

Additional Embodiments

In various embodiments, the disclosure provides a method of producing a dry aldehyde crosslinked polyacrylamide to improve papermaking process and paper strength properties. The method includes a) mixing an aldehyde functionalized polyacrylamide resin with water and certain water soluble compounds, b) removing the water by air or vacuum drying, c) storing and transporting the composition and d) reconstituting or redissolving the composition in water to regain the efficacy of the GPAM resin as a strength additive for paper. The disclosure results in a GPAM resins with low or essentially no water content that can be shipped in dry form with little or no degradation of strength performance and that can be returned to being dissolved in water and used in a paper making or paper treatment process. Thus the method of the present disclosure further improves product shelf life, reduces shipping cost and ease of handling. In another embodiment, the disclosure provides a method of producing a soluble dry GPAM that is stable, can be shipped at high solids, made down with no pH or temperature treatment and used to improve paper making processes and paper strength properties.

In one embodiment the disclosure is a composition including a glyoxalated polyacrylamide resin reacted with a compound with multiple hydroxyl groups where most of the aldehyde groups (hemi acetals) of the glyoxalated resin are reacted with the hydroxyl groups or the hydroxyl compound and such composition is formed by mixing the GPAM with the hydroxyl compound and the mixture is then dried.

In one embodiment the starting GPAM resin is water soluble. In another, the starting hydroxyl compound is water soluble. In still another, both compounds are water soluble and the composition mixture is in the form of a water solution prior to drying. In one embodiment the above composition is formed by the reaction of the aldehyde and hydroxyl groups upon the drying of the composition.

Method of Forming the Composition for Increasing Paper Strength:

This disclosure also provides a method of forming the composition. The method includes the steps of combining the dialdehyde-modified polyacrylamide strengthening agent and the water soluble compound in aqueous media to form the composition. The dialdehyde-modified polyacrylamide strengthening agent may be added to the water soluble compound or vice versa, to form the composition. Moreover, water may be added to the dialdehyde-modified polyacrylamide strengthening agent, the water soluble compound, and/or the combination thereof, in any order and amount. In other words, all orders of addition of the aforementioned components are hereby contemplated.

Without wishing to be bound by theory, in some embodiments the hydroxyl groups of the water soluble compound react with the aldehyde groups of the dialdehyde-modified polyacrylamide strengthening agent to form reversible covalent bonds. Also without wishing to be bound by theory, hydroxyl, amide, or other similar groups of the water soluble compound may, during drying, form hemiacetal linkages with the glyoxal based functionality of the dialdehyde-modified polyacrylamide strengthening agent. Also without being bound by theory, the hydroxyl, amide, or other water soluble groups of the water soluble compound may form associations with the dialdehyde-modified polyacrylamide strengthening agent to prevent the composition from self-crosslinking to the extent that the composition is no longer water soluble. In one embodiment the excess hydroxyl groups may be part of the composition.

The method also includes the step of drying the composition to form a powder or paste that has a water content of less than about 10, 9, 8, 7, 6, 5, 4, 3, 2, 1, or 0.5, weight percent and is stable after storage at about room temperature for about six months. The powder is not particularly limited and may include particles of the composition of any size. It is also contemplated that the powder may be further treated, sieved, or pulverized, to form a powder having a particular average size profile.

The terminology "stable after storage" refers to the product mainlining its performance after shelf storage, for example, in the percentages that are described in detail above.

The composition is dried to form a powder or paste because the composition, in a relatively dry form, no longer substantially self-crosslinks such that the composition can be redissolved or reconstituted by dissolving in water and where then be added during paper making to impart paper strength.

The step of drying may be chosen by one of skill in the art. For example, drying may include, or be free of, application of heat, air-flow, vacuum, tumbling, agitation, etc. In other words, any drying apparatus can be chosen including, but not limited to, an oven, flash dryer, column dryer, freeze dryer, spray dryer, fluid bed dryer, ring dryer, rotary dryer, air dryer, vacuum dryer, and combinations thereof. In one embodiment the composition is dried at room temperature. In another embodiment, the composition is dried at a temperature below about 50° C. In another embodiment, the composition is dried at a temperature between about 50° C. and about 100° C. In a further embodiment, the composition is dried at a temperature above about 100° C.

This step can also be described as drying to remove most of the water such that the composition is no longer able to react with itself during a time period that would prevent it from being stored for 3 months and then re-dissolved or reconstituted to form a functional GPAM solution for use in making paper.

The method further includes reconstituting the powder or paste by adding water thereto. The step of reconstituting may be further described as adding water to the powder or paste such that an aqueous composition is reformed. The aqueous composition may be a solution, emulsion, or dispersion of particles of the composition in water.

The compositions, processes, and articles described above may all be based on compositions that also include, or are free of, other materials commonly used in papermaking or in preparation of water solutions. The compositions may include, or be free of, additives such as defoamers, biocides, pigments, and fillers. Various methods of preparing solutions may be used as known in the art. Various means of pumping, drying, redissolving, and reconstituting materials may be used as known in the art. Paper testing for dry and wet-strength can be done according to methods known in the paper field.

EXAMPLES

Example 1

A GPAM resin was prepared from a combination of poly(acrylamide—diallyldimethylammonium chloride) and glyoxal with a 95:5 mole ratio. The level of glyoxalation was such that 40% of the acrylamide groups of poly(acrylamide—diallyldimethylammonium chloride) were reacted and 15% remained with active aldehyde functionality.

The GPAM resin (as the dialdehyde-modified polyacrylamide strengthening agent) was thoroughly mixed with a 30 wt % solution of maltodextrin (as the water soluble compound). More specifically, the GPAM resin was a 10 wt % solution in water and was mixed with an equal amount of a 30 wt % water solution of maltodextrin to form a 3:1 mixture by weight. A first sample of the mixture was air dried to form Inventive Composition 1. A second sample of the mixture was dried at 50° C. to form Inventive Composition 2. The materials could, if desired, be ground into a powder but were not in these Examples.

After several days, each of Inventive Composition 1 and Inventive Composition 2 was redissolved/reconstituted in water to a form a 5 wt % solution.

Samples of the Inventive Compositions 1 and 2 were used in the making of paper hand sheets and compared to paper hand sheets made using the original GPAM resin without the water soluble compound, i.e., the maltodextrin, to determine paper strength. The original GPAM without the water soluble compound is Comparative Composition 1.

The pulp used to form the paper hand sheets was a 50:50 mix of hard wood and soft wood by weight. The paper was made at a pH of about 6 with tap water.

To evaluate Comparative Composition 1, 0.3 wt % of the comparative composition in the paper on a dry basis produced wet-strength values with 3 second, 30 second, and 30 minute water soak times of 10.34, 8.68, and 6.28 Newtons/inch width, respectively. This is treated as a comparative example.

To evaluate Inventive Composition 1, 0.3 wt % of Inventive Composition 1 was used to make the paper and produced wet-strength values with 3 second, 30 second, and 30 minute water soak times of 3.58, 2.82, and 2.34 Newtons/inch width, respectively.

To evaluate Inventive Composition 2, 0.3% of Inventive Composition 2 was used to make paper and produced wet-strength values with 3 second, 30 second, and 30 minute water soak times of 3.36, 2.84, 2.38 Newtons/inch, respectively.

The paper formed with Inventive Compositions 1 and 2 included only about 25% of the amount of GPAM present as compared to the paper formed using Comparative Composition 1 yet still exhibited significant wet strength. These results reveal that the aldehyde functionality of the GPAM was regenerated when the solid compositions were reconstituted with water.

Example 2

The Inventive Composition 2 that includes the aforementioned mixture dried at 50° C. was used to create additional paper hand sheets that were evaluated to determine temporary wet strength. More specifically, solutions of 0.3 wt % of GPAM were compared with solutions of 0.6 wt % and 1.2 wt % of the Inventive Compositions such that there was 0.15 wt % and 0.3 wt % of GPAM added when were used. The temporary wet strength results are set forth in Table 1 below.

TABLE 1

|  | % GPAM in paper | 3 sec wet-strength | 30 sec wet-strength |
| --- | --- | --- | --- |
| Comparative Composition 1 | 0.3 | 3.83 | 3.64 |
| Inventive Composition 2 | 0.15 | 2.62 | 2.40 |
| Inventive Composition 2 | 0.3 | 3.60 | 3.43 |

Based on the level of GPAM added to the paper, in view of the aforementioned results, it is clear that the Inventive Composition performs almost as well as the Comparative Composition 1. These results must further be considered in view of the surprising and unexpected benefits that are associated with the Inventive Compositions, i.e., the ability to be dried and stored. When the aforementioned results are considered in combination with the unexpected benefits, those of skill in the art appreciate the uniqueness of the instant invention.

Additional Examples

The following examples further demonstrate that performance of glyoxalated polyacrylamide can be maintained after drying and dissolving in aqueous media. In these examples, the reconstituted compositions helped to improve paper properties when the solutions were used during the paper making process.

The examples in Table 2 below are formed by mixing a solution of various water soluble compounds into a solution of GPAM in the dry weight ratios listed below. The mixtures formed therefrom were subsequently air dried overnight. The solubility of the air dried compositions was tested by preparing 1% solution in aqueous media. In some instances, the solubility of material can be enhanced by increasing the pH of the solution.

TABLE 2

| Example | GPAM | Water Soluble Compound | Dry Weight Ratio of GPAM: Water Soluble Compound | Water solubility after drying |
| --- | --- | --- | --- | --- |
| 1-1 Control | GPAM 1 | None | N/A | Insoluble |
| 1-2 | GPAM 1 | Maltodextrin | 1:3 | Soluble |
| 1-3 | GPAM 2 | Maltodextrin | 1:3 | Soluble |
| 1-4 | GPAM 2 | Maltodextrin | 3:1 | Soluble upon pH adjustment to a pH of about 8-9. |
| 1-5 | GPAM 1 | ACM-DADMAC copolymer (95:5) | 1:3 | Soluble |
| 1-6 | GPAM 1 | Amphoteric Polymer | 1:3 | Soluble |
| 1-7 | GPAM 3 | Amphoteric Polymer | 1:3 | Partially Soluble |
| 1-8 | GPAM 3 | ACM-DADMAC copolymer (90:10) | 1:3 | Soluble |

GPAM 1 is a glyoxalated polyacrylamide made from a 95:5 mole % polymer of acrylamide and DADMAC with approximately 8 mole % reactive aldehyde from the glyoxalation.

GPAM 2 is a glyoxalated polyacrylamide made from a 95:5 mole % polymer of acrylamide and DADMAC with approximately 15 mole % reactive aldehyde from the glyoxalation.

GPAM 3 is a glyoxalated polyacrylamide made from a 90:10 mole % polymer of acrylamide and DADMAC with approximately 15 mole % reactive aldehyde from the glyoxalation.

The Amphoteric Polymer is an amphoteric polyacrylamide that is formed from Acrylamide/Acrylic acid/Itaconic acid and Dimethylamino)ethyl methacrylate monomers.

The terminology insoluble means that solubility was evaluated visually at 25° C. and that significant amounts of the compound were not dissolved in water. For example, less than 10 wt % of the compound was dissolved in water.

The terminology soluble means that solubility was evaluated visually at 25° C. and that none of the compound was visible thereby indicating that a clear solution was produced and that complete, or almost complete, solubility was achieved. For example, greater than 95 wt % of the compound was dissolved.

The terminology partially soluble means that solubility was evaluated visually at 25° C. and that some of the compound was visible thereby indicating that a cloudy solution was produced. For example, about 10 to about 95 wt % of the compound was dissolved.

ACM-DADMAC copolymer (95:5) is a cationic polyacrylamide with a 95:5 molar ratio of DADMAC to polyacrylamide.

ACM-DADMAC copolymer (90:10) is a cationic polyacrylamide with a 90:10 molar ratio of DADMAC to polyacrylamide.

Further Examples

Still further examples demonstrate improvement in dry strength properties of paper handsheets made from a 100% recycled medium with 50 ppm hardness, 25 ppm alkalinity, 2.5% GPC D15F oxidized starch, and 2000 μS/cm conductivity.

The system pH was 7.0 and the pulp freeness was 35-420 Canadian Standard Freeness (CSF). Paper handsheets having a basis weight of 100 lb./3000 sq. ft. were made on a Noble and Wood handsheet machine.

Various compositions that are the same as those described above, after being redissolved, were added as dry strength agents at a level of 0.4 weight % of the composition on an active basis versus dry paper pulp. The handsheets were wet pressed and dried on a drum drier at 240° F. for 1 minute giving a moisture content of 3% to 5%. Subsequently, dry tensile (TAPPI Test Method T494, om-01), ring compression index (TAPPI Test Method T822 om-02), and Mullen Burst (TAPPI Test Method T403) were determined. The results are set forth in Table 3 below.

TABLE 3

| Example | Composition | Ring Crush | Dry Mullen | Dry Tensile |
|---|---|---|---|---|
| 2-1 Comparative | None | 100 | 100 | 100 |
| 2-2 | GPAM 1 | 108 | 116.2 | 114.1 |
| 2-3 | 1-2 | 111.2 | 114.1 | 100.3 |
| 2-4 | GPAM 2 | 104.7 | 109.4 | 100 |
| 2-5 | 1-3 | 109.3 | 113.5 | 110.5 |
| 2-6 | 1-5 | 104.4 | 105.6 | 108.3 |
| 2-7 | 1-6 | 115.6 | 110.2 | 102.6 |
| 2-8 | 1-8 | 103 | 107.1 | 97.1 |

This data demonstrates that even after reconstitution, the GPAM maintains its performance relative to the above physical properties.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A composition for increasing paper strength, said composition comprising:
    A. a dialdehyde-modified polyacrylamide strengthening agent; and
    B. a water soluble compound that comprises one or more hydroxyl or amide moieties and that is soluble at 5 wt % or greater in water at 25° C., and
    C. water present in an amount of less than 10 wt %,
    wherein said water soluble compound is present in a weight amount that is greater than a weight amount of said dialdehyde-modified polyacrylamide strengthening agent, and
    wherein said composition is powdered and has a shelf-life of at least six months such that wet strength and/or dry strength paper performance after six months is at least 80% of wet strength and/or dry strength paper performance measured within one month of manufacture of said composition.

2. The composition of claim 1 wherein said dialdehyde-modified polyacrylamide strengthening agent is a glyoxalated polyacrylamide comprising an aldehyde group.

3. The composition of claim 2 wherein said water soluble compound is chosen from a carbohydrate, a polyvinyl alcohol, an acrylamide containing polymer, or combinations thereof.

4. The composition of claim 1 wherein said water soluble compound is chosen from a carbohydrate, a polyvinyl alcohol, an acrylamide containing polymer, or combinations thereof.

5. The composition of claim 1 wherein said dialdehyde-modified polyacrylamide strengthening agent is cationic and is a copolymer comprising the reaction product of an acrylamide monomer and cationic monomer.

6. The composition of claim 1 that is soluble as an 1 to 5 wt % solution in water at 25° C.

7. The composition of claim 1 wherein said water soluble compound is present in a dry weight ratio with said dialdehyde modified polyacrylamide strengthening agent that is greater than 1:1, respectively.

8. The composition of claim 1 wherein said water soluble compound is present in a dry weight ratio with said dialdehyde modified polyacrylamide strengthening agent that is greater than 3:1, respectively.

9. The composition of claim 1 wherein said water soluble compound is further defined as a copolymer formed from reaction of organic monomers.

10. The composition of claim 1 wherein said water soluble compound is chosen from monosaccharides, disaccharides, polysaccharides, and combinations thereof.

11. The composition of claim 1 wherein said water soluble compound is maltodextrin.

12. The composition of claim 1 wherein said water soluble compound is an acrylamide containing polymer that has a cationic or anionic charge.

13. The composition of claim 1 wherein said water soluble compound is an amphoteric polyacrylamide.

14. The composition of claim 1 wherein said dialdehyde-modified polyacrylamide strengthening agent is the reaction product of:
    glyoxal; and
    a prepolymer that is the reaction product of a polyacrylamide monomer and a diallyldimethylammonium chloride monomer,
    wherein an acrylamide to diallylmethylammonium chloride molar ratio is from 99:1 to 50:50, respectively, and
    wherein 40 mol % of acrylamide groups of said polyacrylamide monomer are reacted and 15 mol % of acrylamide groups have active aldehyde functionality.

15. A method of forming a composition for increasing paper strength, said method comprising the steps of:
    providing the powdered composition of claim 1; and
    reconstituting the powdered composition by adding water thereto.

16. The method of claim 15 wherein the dialdehyde-modified polyacrylamide strengthening agent is a glyoxalated polyacrylamide comprising an aldehyde group.

17. The method of claim 15 wherein the water soluble compound is chosen from a carbohydrate, a polyvinyl alcohol, an acrylamide containing polymer, or combinations thereof and the water soluble compound is present in a dry weight ratio with said dialdehyde modified polyacrylamide strengthening agent that is greater than 1:1, respectively.

18. The method of claim 15 wherein the dialdehyde-modified polyacrylamide strengthening agent is the reaction product of:
    glyoxal; and
    a prepolymer that is the reaction product of a polyacrylamide monomer and a diallyldimethylammonium chloride monomer,
    wherein an acrylamide to diallylmethylammonium chloride molar ratio is from 99:1 to 50:50, respectively, and wherein 40 mol % of acrylamide groups of said polyacrylamide monomer are reacted and 15 mol % of acrylamide groups have active aldehyde functionality.

19. A method for increasing the wet and/or dry strength of paper, said method comprising the steps of:
    providing the powdered composition of claim 1;
    reconstituting the powdered composition;
    providing an aqueous slurry of cellulosic fibers;
    combining the reconstituted composition and the aqueous slurry of cellulosic fibers; and
    forming the paper from the combination of the reconstituted composition and the aqueous slurry of cellulosic fibers wherein the paper has increased wet and/or dry strength as compared to a paper formed without the reconstituted composition.

20. A powdered composition for increasing paper strength, said composition comprising:
    A. a GPAM resin that is the reaction product of poly(acrylamide-diallyldimethylammonium chloride) and glyoxal in a 95:5 to 90:10 mole ratio;
    B. a water soluble compound; and
    C. water present in an amount of less than 10 wt %,
    wherein said GPAM resin is present in a dry weight ratio to said water soluble compound of 1:3 to 3:1,
    wherein said composition has a shelf-life of at least six months such that wet strength and/or dry strength paper performance after six months is at least 80% of wet strength and/or dry strength paper performance measured within one month of manufacture of said composition, and
    wherein the water soluble compound is selected from the group consisting of:
    (1) maltodextrin,
    (2) an amphoteric polyacrylamide that is the reaction product of acrylamide, acrylic acid, itaconic acid, and dimethylamino-ethylmethacrylate monomers, and
    (3) a cationic polyacrylamide comprising a molar ratio of diallyldimethylammonium chloride to polyacrylamide of from 95:5 to 90:10.

* * * * *